(12) United States Patent
Maurer et al.

(10) Patent No.: US 9,970,355 B2
(45) Date of Patent: May 15, 2018

(54) IMPINGEMENT COOLING ARRANGEMENT (71) Applicant: Ansaldo Energia Switzerland AG, Baden (CH)

(72) Inventors: Michael Thomas Maurer, Bad Säckingen (DE); Michael Huber, Baden (CH); Selma Zahirovic, Basel (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 715 days.

(21) Appl. No.: 14/514,683

(22) Filed: Oct. 15, 2014

(65) Prior Publication Data
US 2015/0118019 A1 Apr. 30, 2015

(30) Foreign Application Priority Data
Oct. 24, 2013 (EP) .................................. 13190131

(51) Int. Cl.
*F23R 3/04* (2006.01)
*F02C 7/141* (2006.01)
(Continued)

(52) U.S. Cl.
CPC .............. *F02C 7/141* (2013.01); *F01D 9/023* (2013.01); *F01D 25/14* (2013.01); *F23R 3/04* (2013.01);
(Continued)

(58) Field of Classification Search
CPC .. F23R 2900/03043; F23R 2900/03044; F23R 2900/03045; F23R 3/002
See application file for complete search history.

(56) References Cited

U.S. PATENT DOCUMENTS 4,446,693 A * 5/1984 Pidcock .................. F23R 3/002
60/757
4,719,748 A 1/1988 Davis, Jr. et al.
(Continued)

FOREIGN PATENT DOCUMENTS

CN 1558099 A 12/2004
CN 102128088 A 7/2011
(Continued)

OTHER PUBLICATIONS

Office Action (Communication pursuant to Article 94(3) EPC) dated Oct. 20, 2016, by the European Patent Office in corresponding European Patent Application No. 13190131.6. (4 pages).
(Continued)

*Primary Examiner* — Justin Seabe
(74) *Attorney, Agent, or Firm* — Buchanan Ingersoll & Rooney PC (57) ABSTRACT

The present disclosure refers to an impingement cooling arrangement for cooling a duct wall of a duct guiding a hot gas flow. The impingement cooling arrangement includes an impingement sleeve which is at least partly disposed in a compressed air plenum, and spaced at a distance to the duct wall to form a cooling flow path between the duct wall and the impingement sleeve such that cooling air injected from the compressed air plenum through apertures in the sleeve impinges on the duct wall. At least one flow diverter is arranged in the cooling flow path to divert the cross flow away from at least one aperture. Besides the impingement cooling arrangement a gas turbine with such an arrangement as well as a method for cooling a duct wall are provided.

20 Claims, 3 Drawing Sheets

(51) Int. Cl.
*F01D 9/02* (2006.01)
*F01D 25/14* (2006.01)

(52) U.S. Cl.
CPC .... *F05D 2250/28* (2013.01); *F05D 2260/201* (2013.01); *F23R 2900/03044* (2013.01)

(56) References Cited

U.S. PATENT DOCUMENTS

| | | | | |
|---|---|---|---|---|
| 5,259,182 | A | 11/1993 | Iwai et al. | |
| 6,341,485 | B1* | 1/2002 | Liebe | F23R 3/002 60/760 |
| 9,052,111 | B2* | 6/2015 | Erbas-Sen | F23R 3/06 |
| 9,243,801 | B2* | 1/2016 | Cunha | F23R 3/002 |
| 2005/0044857 | A1 | 3/2005 | Glezer et al. | |
| 2011/0173984 | A1 | 7/2011 | Valeev et al. | |
| 2012/0297784 | A1* | 11/2012 | Melton | F23R 3/002 60/772 |
| 2013/0333388 | A1 | 12/2013 | Polisetty et al. | |
| 2015/0101336 | A1* | 4/2015 | Numata | F23R 3/44 60/755 |

FOREIGN PATENT DOCUMENTS

| | | | |
|---|---|---|---|
| CN | 103486615 A | 1/2014 | |
| EP | 1 207 273 A2 | 5/2002 | |
| EP | 1207273 A2 | 5/2002 | |
| EP | 2674677 A2 | 12/2013 | |
| WO | WO 2011020485 A1 * | 2/2011 | ............. F01D 5/189 |

OTHER PUBLICATIONS

Office Action (First Office Action) and Search Report dated Jan. 28, 2015, by the Chinese Patent Office in corresponding Chinese Patent Application No. 201410574041.1, and an English Translation of the Office Action. (13 pages).

Chinese Office Action Serial No. 201410574041.1 dated Sep. 18, 2017 (Chinese).

Chinese Office Action Serial No. 201410574041.1 dated Sep. 18, 2017 (English).

\* cited by examiner

IMPINGEMENT COOLING ARRANGEMENT

CROSS-REFERENCE TO RELATED APPLICATIONS

This application claims priority to European application 13190131.6 filed Oct. 24, 2013, the contents of which are hereby incorporated in its entirety.

TECHNICAL FIELD

The disclosure refers to an Impingement cooling arrangement, more particularly, to an Impingement cooling arrangement for cooling a hot gas duct.

BACKGROUND

The thermodynamic efficiency of power generating cycles depends on the maximum temperature of its working fluid which, in the case for example of a gas turbine, is the hot gas exiting the combustor. The maximum feasible temperature of the hot gas is limited by combustion emissions as well as by the operating temperature limit of the metal parts in contact with this hot gas, and on the ability to cool these parts below the hot gas temperature. The cooling of the hot gas duct walls forming the hot gas flow paths of advanced heavy duty gas turbines is difficult and currently known cooling methods carry high performance penalties, i.e. lead to a reduction in power and efficiency.

Impingement cooling is one of the most effective cooling techniques for components which are exposed to gases with high hot gas temperatures. For impingement cooling of a duct a sleeve is disposed a short distance away from the duct outer surface. The impingement sleeve contains an array of holes through which compressed cooling gas discharge to generate an array of air jets which impinge on and cool the outer surface of the duct. After impingement the cooling gas flows in a cooling path delimited by the duct and the impingement sleeve towards one end of the duct. This flow leads to a so called cross flow. Usually the first impingement rows allow impingement of the duct without any cross-flow in the cooling channel. As the number of subsequent impingement rows is increasing towards the end of the duct, the cross flow in the cooling channel builds up. As a disadvantage, the increasing cross flow in the cooling channel hinders and lowers the possible heat transfer coefficients of the impingement cooling as the impingement jets are diverted and bent away from the combustion chamber wall (see FIG. 3a) before they impinge on it.

To limit the cross flow velocity it has been suggested in the U.S. Pat. No. 4,719,748 A to increase the height of the cooling channel over the length of the cooling channel. However, an increase of the height of the cooling channel reduces the speed of the impingement jet reaching the duct wall.

In addition to the decreasing efficiency of impingement cooling over the length of a duct cooled with impingement cooling the typical heat load of a duct wall is not homogeneous. For example most combustion chambers of gas turbines show an inclination with respect to the engine axis, which leads to a change in the hot gas flow direction. The hot gas flow in the combustion chamber has to adapt to this change in main flow direction leading to areas with higher heat load, so-called hot spots, on typical locations off the combustion chamber walls. To ensure the life time of the areas of the duct which are exposed to increased heat load as increased cooling is required at these locations.

SUMMARY

The object of the present disclosure is to propose an impingement cooling arrangement which allows efficient impingement cooling of a duct wall independent of the position on the duct wall guiding a hot gas flow.

The disclosed impingement cooling arrangement for cooling a duct wall of a duct guiding a hot gas flow in a hot gas flow path with an upstream end and a downstream end comprises an impingement sleeve. The impingement sleeve is at least partly disposed in a compressed air plenum, and the sleeve has a plurality of apertures surrounding the duct such that cooling air injected from the compressed air plenum through the apertures impinges on the duct wall. The sleeve is spaced at a distance from the duct wall to form a cooling flow path between the duct wall and the impingement sleeve such that the injected air flows as cross flow towards an exit at the end of the sleeve.

Such an arrangement can for example be used for cooling a duct wall of a gas turbine, more specifically for cooling a wall of a combustor or combustion chamber.

The cooling flow and the hot gas flow typically flow in counterflow, i.e. the cooling flow flows from the downstream end of the duct to the upstream end of the duct. However, arrangements with parallel cooling air flow and hot gas flow are conceivable. Such a parallel flow arrangement can be advantageous for combustion chambers and combustor arrangements with staged or sequential combustion where additional air is injected in the second combustion stage. The cooling air can for example also be air for a so called late lean combustion. Further, the cooling air can be used as dilution air for a second combustion stage to cool the hot gases by admixing the cooing air to the hot gas downstream of a first flame.

According to a first embodiment at least one flow diverter is arranged in the cooling flow path to divert the cross flow away from at least one aperture.

A flow diverter can be a rib or a wall extending into the cooling channel from the sleeve or the duct wall or can be connecting the sleeve with the duct wall.

Typically the flow diverter is connected to the sleeve or forms an integral part of the sleeve as the thermal load of the sleeve is lower, since it is not exposed to the hot gas, and cheaper materials can therefore be used. Alternatively, the flow diverter can be connected to the duct wall or form an integral part of the duct wall. In this case they can act as cooling ribs to better cool the duct wall.

According to another embodiment of the impingement cooling arrangement a flow diverter is arranged downstream of a first aperture for injecting cooling air in the cooling flow path. More particular the diverter is arranged downstream of a first aperture and upstream of a second aperture for injection cooling air in the cooling flow path for impingement cooling.

More specifically the flow diverter causes a wake in the cross flow and at least one aperture for injecting cooling air in the cooling flow path is arranged in the wake of the flow diverter.

In a further embodiment of the impingement cooling arrangement the flow diverter is extending from the duct wall to the impingement sleeve. Thus the flow diverter can close a section of the cooling flow channel and completely stop the cross flow in this section.

In yet a further embodiment of the impingement cooling arrangement the flow diverter separates a part of the cooling air channel from the upstream cross flow for starting a new cooling flow section, which opens to the cooling air channel at a downstream end of the flow diverter.

In an alternative embodiment of the impingement cooling arrangement according the flow diverter is extending from the duct wall or from the impingement sleeve into the cooling flow path with a height which is smaller than the height of the cooling flow path. Thus a part of the cross flow can pass the flow diverter to allow a minimum cooling air flow even if an impingement aperture downstream of the flow diverter is blocked for example by dirt during operation. In addition the resulting gap between flow diverter and duct wall, respectively between flow diverter and sleeve allows for relative movements of the two components due to thermal expansion.

In a further embodiment of the impingement cooling arrangement the flow diverter comprises a wall section which is arranged at an angle between +/−5° and 90° relative to an axis of the duct. To better block some part of the cooling flow path the flow diverters can be arranged at an angle between +/−30° and 90° or at an angle of more than 45° and up to 90°.

In yet a further embodiment the impingement cooling arrangement comprises at least a pair of flow diverters arranged next to each other. Each of the flow diverters comprises a wall section, and the wall sections are orientated relative to each other such that they open with an angle in the range of 10° to 160°. Due to the opening of the wall sections the flow area between the two flow diverters increases in the downstream direction of the cross flow. Due to the increase in the flow area the velocity of the cross flow between the two wall sections is reduced to allow more effective impingement cooling in this area. Respectively, the flow velocity can be kept constant in spite of additional cooling air being injected between the two wall sections for impingement cooling or the increase in cross flow velocity is reduced relative to an arrangement without flow diverters.

More specifically the impingement cooling arrangement can have a height of the cooling flow path which is substantially constant along a length of the cooling flow path. The length of the cooling flow path is the extension in flow direction of the cooling flow in the cooling flow path from an upstream end at the first impingement hole to the exit of the cooling flow path at a downstream end of the cooling flow path.

In an impingement cooling arrangement the impingement density in an area of the cooling air flow path in which the deflected flow passes the duct wall can be smaller than in the region downstream of the flow diverter. More specifically the impingement density in the region downstream of the flow diverter can be higher for a length of at least two times the height of the cooling flow path.

The impingement density is the impingement flow per duct wall area. The impingement density is a function of the number of apertures per unit area, of the apertures cross sectional area, as well as the available pressure drop for driving impingement jets and the loss coefficient of the apertures or the resulting velocity of the impingement jets.

According to another embodiment of the impingement cooling arrangement a dividing wall is arranged upstream or downstream of the flow diverter, which is aligned with a main extension parallel to the flow direction of the cross flow during operation. Such a dividing wall can also be integrated into the flow diverter.

Such a dividing wall upstream of the flow diverter can be useful to guide the cooling air flow symmetrically around the flow diverter in case of non-symmetric thermal loading of wall. Thus it can be assured that regions on both sides of the flow diverter are sufficiently cooled.

In yet another embodiment of the impingement cooling arrangement the flow diverter is arranged such that during operation it causes a dead water in a downstream direction of the cross flow. At least one aperture is arranged in the sleeve such that cooling air impinges on the duct wall in the dead water. The flow diverter can be a simple wall or another blunt body arranged in the cooling flow or can for example be a cylinder.

Typically the diverter is arranged to extend from duct wall or the sleeve substantially at a right angle to the wall or sleeve surface.

Specifically, the duct cooled by the impingement cooling arrangement is delimiting a combustion chamber.

Besides the impingement cooling arrangement a gas turbine comprising such an impingement cooling arrangement is an object of the disclosure.

Further a method for impingement cooling a duct wall of a duct guiding hot gases in a hot gas flow path having an upstream end and a downstream end is an object of the disclosure. An impingement sleeve having a plurality of apertures is surrounding the duct wall which has to be cooled, and is spaced at a distance therefrom to form a cooling flow path between the duct wall and the impingement sleeve. Cooling air is injected through the apertures to impinge on the duct wall and flows as cross flow towards an exit at one end of the hot gas flow path. According to the method at least part of the cross flow is diverted away from at least one aperture by at least one flow diverter which is arranged upstream of the aperture in the cooling flow path.

According to a further embodiment of the method the impingement cooling air is injected through the apertures downstream of the flow diverter such that at a distance of three times the height of the cooling flow path from the flow diverter the axial component of the flow velocity of the cooling air in the cooling flow path is substantially homogeneous. To achieve a homogeneous flow the injection flow has to match the flow around the diverter, i.e. the injection impingement flow downstream of the diverter per flow path area downstream of the diverter is equal to the incoming cross flow plus the injected impingement flow per cooling flow path area in the diverted flow at the sides of the diverter are substantially equal. Substantially equal can mean that the difference between resulting flow velocity in the area downstream of the diverter and the flow velocity in the areas at the sides of the diverters is less than 30% of the overall flow velocity. Preferably the difference is less than 10%.

The combustion air and cooling air can be ambient air, recirculated flue gas from a combustion process or a mixture of ambient air and recirculated flue gas.

BRIEF DESCRIPTION OF THE DRAWINGS

The disclosure, its nature as well as its advantages, shall be described in more detail below with the aid of the accompanying schematic drawings of preferred but non-exclusive embodiments.

Referring to the drawings:

FIG. 3a, b show a combustor with an impingement cooling arrangement indicated on one duct wall and the corresponding development of the cross flow and the resulting heat transfer coefficient over the length of a conventional cooling channel;

DETAILED DESCRIPTION

Figure 1:
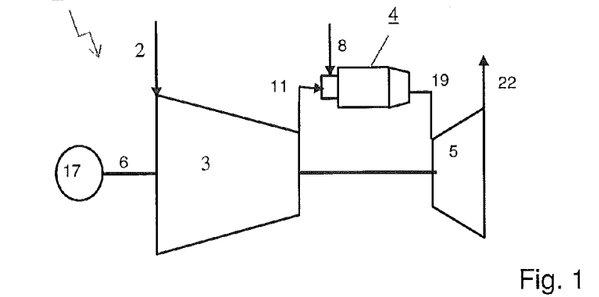
FIG. 1 shows a gas turbine with a compressor, a combustion arrangement, and a turbine.

FIG. 1 shows a gas turbine 1 with an impingement cooled combustor 4. It comprises a compressor 3, a combustor 4, and a turbine 5.

Intake air 2 is compressed to compressed gas 11 by the compressor 3. Fuel 8 is burned with the compressed gas in the combustor 4 to generate a hot gas flow 19. The hot gas is expended in the turbine 5 generating mechanical work.

Typically, the gas turbine system includes a generator 17 which is coupled to a shaft 6 of the gas turbine 1. The gas turbine 1 further comprises a cooling system for the turbine 5 and the combustor 4, which is not shown, as it is not the subject of this disclosure.

Exhaust gases 26 leave the turbine 5. The remaining heat is typically used in a subsequent water steam cycle, which is also not shown here.

Figure 2A:
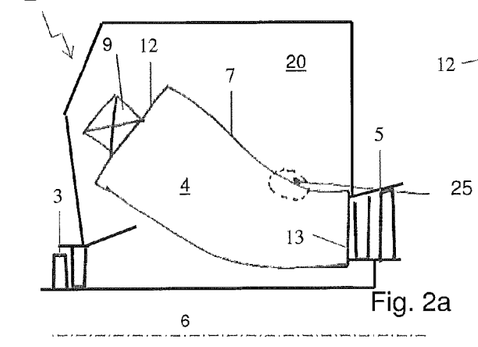
FIG. 2a shows a side view of a gas turbine with a combustor and indicating a typical hot spot location on the duct wall of the combustion chamber.
Figure 2B:
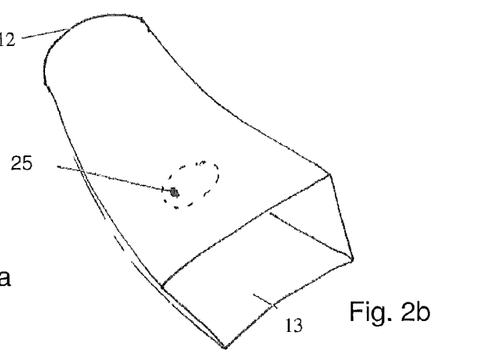
FIG. 2b shows a perspective view of such a combustion chamber.

FIG. 2a shows a side view of a gas turbine 1 with a compressor 3, a combustor 4 including a burner 9 and a combustion chamber, and a turbine 5. The combustion chamber is delimited by the duct wall 7 and extends from an upstream end 12 to a downstream end 13. Typically a fuel air mixture is introduced into the combustion chamber from the burner 9 at the upstream end 12 and hot gases are supplied to the turbine 5 at the downstream end 13. The combustor is arranged in a compressor plenum 20. A typical hot spot 25 is indicated on the duct wall 7 of the combustion chamber. In FIG. 2b a perspective view of such a combustion chamber including the hot spot 25 is shown.

Figures 3A, 3B:
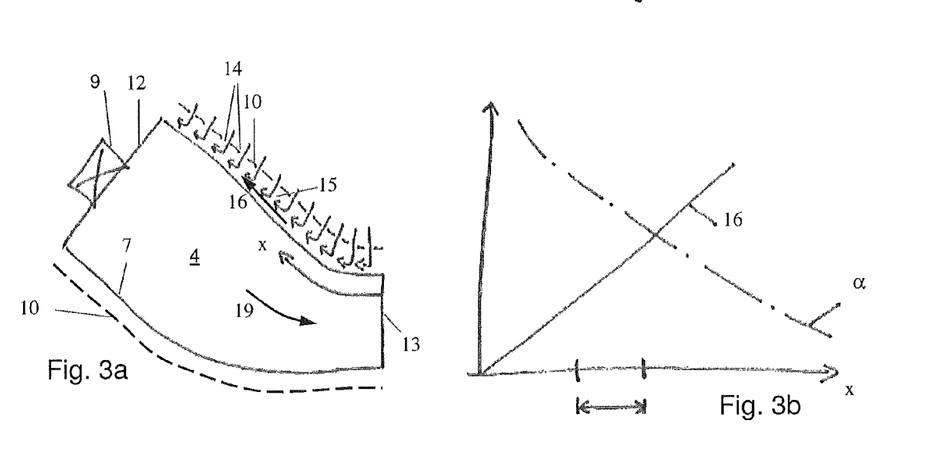

FIG. 3a shows a combustor 4 with an impingement cooling arrangement indicated on one duct wall 7. The combustor comprises a burner 9 at the upstream end 12 and a combustion chamber extending to the downstream end 13. The combustion chamber is delimited to the sides by the duct wall 7. For the impingement cooling a sleeve 10 comprising apertures 14 for impingement cooling of the duct wall 7 is arranged around the combustion chamber. After the cooling air impinges on the duct wall 7 it flows as a cross flow 16 in the cooling flow path 15 formed by the duct wall 7 and the sleeve 10 towards the upstream end 12 of the combustion chamber in counter flow to the hot gas flow 19 inside the combustion chamber.

The corresponding development of the cross flow 16 in the cooling flow path 15 and the resulting heat transfer coefficient α over the length x is shown in FIG. 3b for the conventional arrangement of FIG. 3a.

Figure 4:
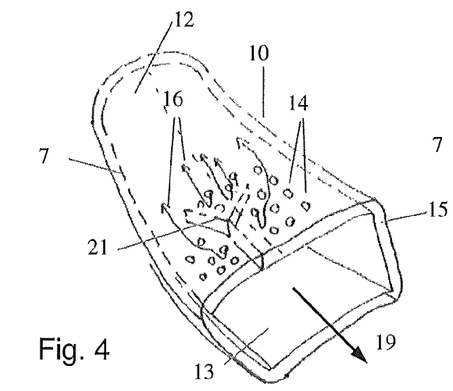
FIG. 4 shows a perspective view of an impingement cooled combustion chamber with a Y-shaped flow diverter.

A first example of an impingement cooling arrangement according to the disclosure is shown in a perspective view in FIG. 4. FIG. 4 shows an impingement cooled duct wall 7 of a duct guiding a hot gas flow 19. The hot gas flow path has an upstream end 12 and a downstream end 13 and comprises an impingement sleeve 10. The sleeve has a plurality of apertures 14 surrounding the duct wall 7, and is spaced at a distance from the duct wall 7 to form a cooling flow path 15. Cooling air injected from the compressed air plenum (not shown) through the apertures 14 impinges on the duct wall 7 and flows as cross flow 16 towards an exit at an upstream end 12 of the hot gas flow path.

In the cooling flow path 15 a Y-shaped flow diverter 21 is arranged to divert the cross flow away from at least one aperture 14. The Y-shaped diverter 21 is a wall arrangement in the shape of a Y which is extending from the sleeve 10 to the duct wall 7. The diverter wall (also called rib) is extending at a substantially right angle to the surface of the sleeve 10 and duct wall 7. The Y-shaped diverter 21 is oriented such that the single leg of the Y is aligned parallel to the main extension of the duct, i.e. pointing in the direction of the hot gas flow 19 thereby dividing the cross flow 16. The two arms of the Y open like a v in the flow direction of the cross flow 16 thereby diverting the cross flow 16 away from the apertures 14 downstream of the flow diverter 21. The cooling air injected as impingement air downstream of the flow diverter 21 therefore impinges on the duct wall 7 in a region which is practically free of a cross flow 16 leading to a high heat transfer coefficient. A new cross flow 16 starts downstream of the flow diverter 21.

Figure 5:
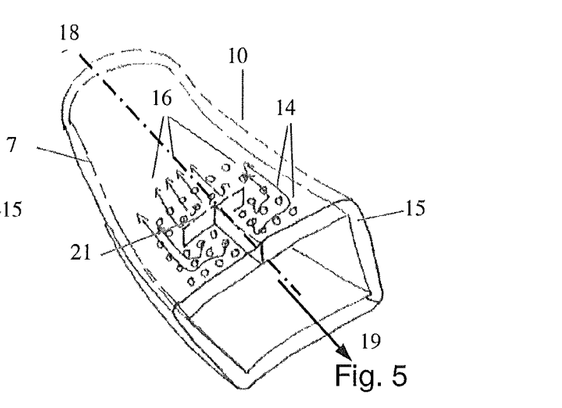
FIG. 5 shows a perspective view of an impingement cooled combustion chamber with an upstream facing T-shaped flow diverter.

The embodiment of FIG. 5 is based on FIG. 4. In the example shown in FIG. 5 the flow diverter 21 has the form of an upstream facing T. The central leg of the flow diverter 21 is aligned parallel to the flow direction of the cross flow 16 and pointing in an upstream direction. The horizontal leg of the T is substantially at a right angle to the axis 18 of the duct. The horizontal leg of the T blocks the cross flow 16, along a section of the duct wall 7. In this example the cross flow 16 is parallel to the axis 18 of the duct. The cooling air injected as impingement air downstream of the flow diverter 21 therefore impinges on the duct wall 7 in a region which is practically free of a cross flow 16 leading to a high heat transfer coefficient. A new cross flow 16 starts downstream of the flow diverter 21.

Figure 6:
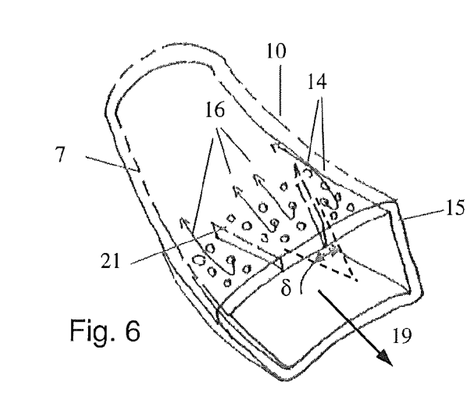
FIG. 6 shows a perspective view of an impingement cooled combustion chamber with two flow diverters arranged at angle opening to the downstream direction of the cooling flow.

The embodiment of FIG. 6 is also based on FIG. 4. In the example shown in FIG. 6 the flow diverter 21 comprises two wall sections, which open relative to each other with an angle in the range of 10° to 160° such that the flow area between the two wall sections increases in a downstream direction of the cross flow (16). At the upstream end of the flow diverter 21 an opening remains between the two wall sections which allow some inflow of cross flow.

Figure 7:
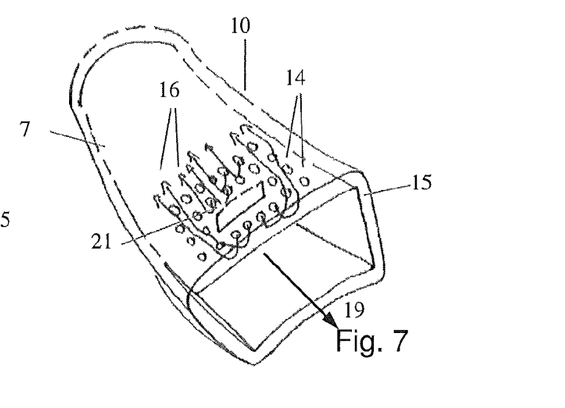
FIG. 7 shows a perspective view of an impingement cooled combustion chamber with a straight wall as flow diverter.

The embodiment of FIG. 7 is based on FIG. 5. It shows a perspective view of an impingement cooled combustion chamber with a simple rib as flow diverter 21. The rib is arranged at a right angle to the cross flow 16.

The arrangement of FIG. 7 can be advantageous to guide the cooling air in the cooling flow path 15 for symmetric thermal load in the flow region of the flow diverter 21.

Figure 8:
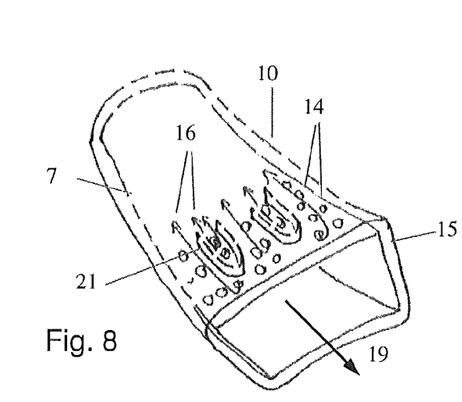
FIG. 8 shows a perspective view of an impingement cooled combustion chamber with a downstream facing U-shaped flow diverter.

The embodiment of FIG. 8 is based on FIG. 4. The embodiment of FIG. 8 differs from the embodiment of FIG. 4 in that the Y-shaped diverter 21 is replaced by a U-shaped diverter. The u shaped diverter 21 is arranged such that the two legs of the U are aligned with the cross flow 16 pointing in the downstream direction. The cooling air injected as impingement air inside the U-shaped flow diverter 21 impinges on the duct wall 7 in a region which is practically free of a cross flow 16 leading to a high heat transfer coefficient. A new cross flow 16 starts between the legs of the U-shaped flow diverter 21.

Figure 9:
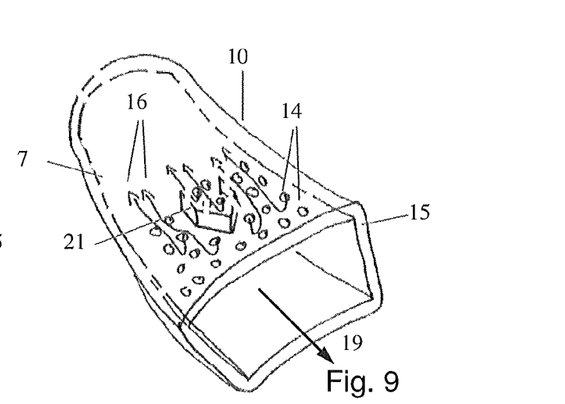
FIG. 9 shows a perspective view of an impingement cooled combustion chamber with a downstream facing V-shaped flow diverter.

The embodiment of FIG. 9 is based on FIG. 8. The embodiment of FIG. 9 differs from the embodiment of FIG. 4 in that the U-shaped diverter is modified to look similar to a V-shape with the ends of the V extending parallel to the cross flow 16 pointing in the downstream direction. The cooling air injected as impingement air inside the V-shaped flow diverter 21 impinges on the duct wall 7 in a region which is practically free of a cross flow 16 leading to a high heat transfer coefficient. A new cross flow 16 starts between the legs of the V-shaped flow diverter 21.

Figure 10:
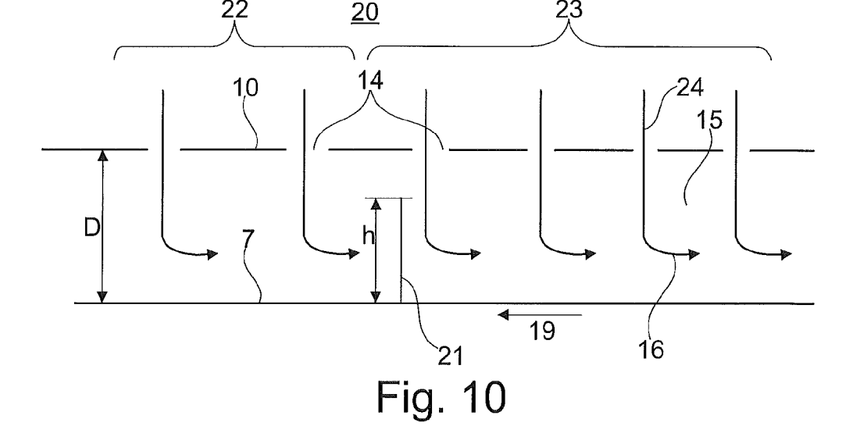
FIG. 10 shows a side view of an impingement cooled duct wall with a flow diverter having a smaller height than the cooling channel.

The examples of FIGS. 4 to 9 show flow diverters 21 which extend from the duct wall 7 to the sleeve 10. Flow diverters which extend only part of the height D of the cooling flow path 15 either from the impingement sleeve 10 or from the duct wall 7 are conceivable. FIG. 10 shows a side view of an impingement cooled duct wall 7 with impingement sleeve 10 spaced apart from the duct wall 7 at a distance D. Impingement flow 24 is injected from a compressed gas plenum 20 around the sleeve 10 through apertures 14 into the cooling flow path 15. The impingement flow 24 is forming a cross flow 16 in the cooling flow path 15. The height h of the flow diverter 21 arranged in the cooling flow path 15 is smaller than the height D of the cooling flow path 15. Upstream of the flow diverter 21 the distance between apertures 14 is larger than downstream of the flow diverter 21 leading to a Low impingement density zone 22, relative to a high impingement density zone 23 downstream of the flow diverter.

Figure 11:
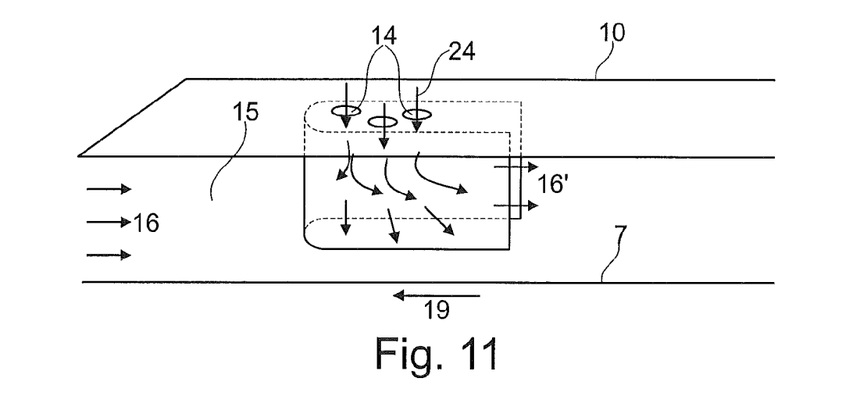
FIG. 11 shows a perspective view of an impingement cooled duct wall with an U-shaped flow diverter, which opens towards the downstream direction of the cooling flow and separates a part of the cooling air channel from the upstream cross flow.

FIG. 11 shows a perspective view of a cut out of U-shaped flow diverter 21 in a cooling flow channel 15 of an impingement cooled duct wall 7 which is a similar to the one shown in FIG. 8. It shows in more detail the incoming cross flow 16, the impingement flow 24, which is injected through the apertures 14 into the space delimited by the duct wall 7, the sleeve 10 and the U-shaped flow diverter 21 and opens to a downstream direction of the cross flow 16. The impingement flow 24 impinges unobstructed on the duct wall 7 before a new cross flow 16' develops between the legs of the U-shaped diverter.

Figure 12A:
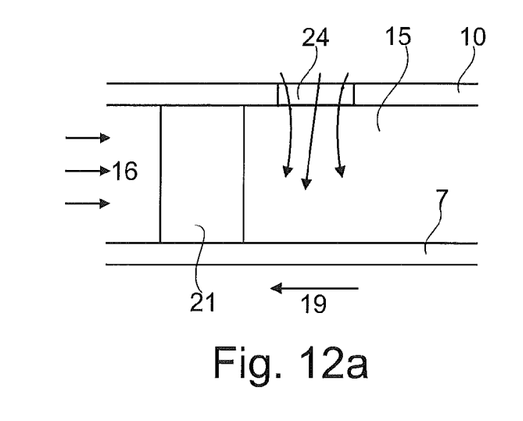
FIG. 12a shows a side view of an impingement cooled duct wall with a cylindrical flow diverter and impingement cooling in the wake and FIG. 12b a cut though of the flow diverter.

FIG. 12*a* shows a detailed side view of an another embodiment with an impingement cooled duct wall 7 with a cylindrical flow diverter 21, which extends from the duct wall 7 to the sleeve 10 in the cooling flow path 15. At least one aperture 14 for injecting the impingement flow 24 is arranged downstream of the cylindrical flow diverter 21 and impingement cooling air is injected through it in the wake.

Figure 12B:
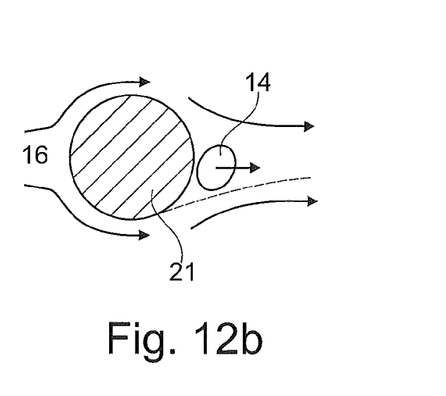

FIG. 12*b* shows a cut though of the flow diverter indicating the location of the aperture 14 in the wake.

In these embodiments impingement cooled ducts which are typical for a gas turbine with can combustors are shown. The can combustors are typically circumferentially distributed around the shaft 6 of the gas turbine and have a transition piece or transition section for the transition from a circular cross section of the combustion chamber to a cross section with a shape of a section of an annulus or practically rectangular flow cross section at the outlet, i.e. at the turbine inlet. The transition piece can be integrated into the duct or be a separate duct and the disclosed impingement cooling arrangement can equally be used for the duct guiding the hot gases in the transition piece.

The impingement cooling arrangement can also be used for annular ducts having a duct wall on the outer surface and on the inner surface guiding a hot gas flow in the space between the two duct walls. These can be applied to annular combustion chambers.

For all shown arrangements can or annular architectures or any combination of the two is possible.

All the explained advantages are not limited to the specified combinations but can also be used in other combinations or alone without departing from the scope of the disclosure. Other possibilities are optionally conceivable, for example, the combination of different flow diverter geometries such as a for example an arrangement with T-shaped and V-shaped diverters is conceivable. Also the use of other flow diverting elements such as L-shaped or W-shaped diverters is possible.

Further, the arrangement of the flow diverters relative to the flow direction in the flow path can be modified. For example based on FIG. 5 a T-shaped flow diverter with a downstream facing can be used. In such an arrangement the central leg of the T is aligned with the cross flow 16 and pointing in the downstream direction of the cross flow 16. Such an arrangement can be advantageous to guide the cooling air in the cooling flow path 15 for asymmetric thermal load in the flow region downstream of horizontal leg of the T-shaped flow diverter 21. In contrast the arrangement of FIG. 5 can be advantageous for asymmetric thermal loads upstream of horizontal leg of the T-shaped flow diverter 21 or in the flow field of the diverted cross flow 16.

To generate a wake further geometries of the flow diverter besides cylinders such as for example a diverter with an oval cross section or any blunt geometry is conceivable.

The disclosed impingement cooling arrangement and method for cooling can be used in gas turbines as well as in other machines or plants in which a hot gas has to be guided by a duct wall such as for example a furnace or a reactor.

The invention claimed is:

1. An impingement cooling arrangement for cooling a duct wall of a duct guiding a hot gas flow in a hot gas flow path having an upstream end and a downstream end, comprising:

an impingement sleeve, the impingement sleeve being at least partly disposed in a compressed air plenum, and the impingement sleeve having a plurality of apertures surrounding the duct wall, and spaced at a distance therefrom to form a cooling flow path between the duct wall and the impingement sleeve such that cooling air injected from the compressed air plenum passes through the apertures during operation to impinge on the duct wall and subsequently flow as cross flow towards an exit of the cooling flow path, and at least one flow diverter is arranged in the cooling flow path between the impingement sleeve and the duct wall adjacent a first aperture of the plurality of apertures to divert the cross flow away from the first aperture of the plurality of apertures, each flow diverter comprising a plurality of walls comprising a first wall, a second wall, and a third wall, the second wall positioned between the first and third walls, the second wall configured to block the cross flow from the first aperture so that cooling air passing through the first aperture impinges upon the duct wall in a region that is free of the cross flow, the first wall configured to direct the cross flow away from the first aperture within the cooling flow path and the third wall configured to direct the cross flow away from the first aperture within the cooling flow path; and a dividing wall arranged upstream or downstream of the flow diverter or integrated in the flow diverter, which is aligned with a main extension of the duct wall, the dividing wall extending from the second wall in a direction that is parallel to the flow direction of the hot gas flow during operation.

2. The impingement cooling arrangement according to claim 1, wherein the flow diverter is arranged downstream of the first aperture of the plurality of apertures, the first wall, the second wall, and the third wall of the flow divider at least partially defining a U-shape of the flow divider or a Y-shape of the flow divider.

3. The impingement cooling arrangement according to claim 1, wherein the flow diverter is extending from the duct wall to the impingement sleeve.

4. The impingement cooling arrangement according to claim 3, wherein the flow diverter separates a part of the cooling flow path from upstream cross flow for starting a cooling flow section of the cooling flow path that is downstream of the flow diverter that has a cross flow from cooling air that passes through the first aperture and impinges the duct wall.

5. The impingement cooling arrangement according to claim 1, wherein the flow diverter is extending from the duct wall or from the impingement sleeve into the cooling flow path with a height which is smaller than a height of the cooling flow path.

6. The impingement cooling arrangement according to claim 1, wherein at least one of the first wall, second wall, and third wall of the flow diverter comprises a wall section arranged at an angle between +/−5° and 90° relative to an axis of the duct.

7. The impingement cooling arrangement according to claim 1, wherein a height of the cooling flow path is substantially constant along a length of the cooling flow path.

8. The impingement cooling arrangement according to claim 1, wherein an impingement density in an area of the cooling flow path in which the deflected flow passes the duct wall is smaller than in a region downstream of the flow diverter for a length of at least two times a height of the cooling flow path.

9. The impingement cooling arrangement according to claim 1, wherein during operation the flow diverter causes a dead water in a downstream direction of the cross flow and in that at least one aperture is arranged in the impingement sleeve such that cooling air impinges on the wall in the dead water.

10. The impingement cooling arrangement according to claim 1, wherein the duct is delimiting a combustion chamber.

11. A gas turbine with an impingement cooling arrangement according to claim 1.

12. An impingement cooling arrangement for cooling a duct wall of a duct guiding a hot gas flow in a hot gas flow path having an upstream end and a downstream end, comprising:

an impingement sleeve, the impingement sleeve being at least partly disposed in a compressed air plenum, and the impingement sleeve having a plurality of apertures surrounding the duct wall, and spaced at a distance therefrom to form a cooling flow path between the duct wall and the impingement sleeve such that cooling air injected from the compressed air plenum passes through the apertures during operation to impinge on the duct wall and subsequently flow as cross flow towards an exit of the cooling flow path, at least one first flow diverter arranged in the cooling flow path between the impingement sleeve and the duct wall adjacent a first aperture of the plurality of apertures to divert the cross flow away from the first aperture of the plurality of apertures, each first flow diverter comprising a plurality of walls comprising a first wall, a second wall, and a third wall, the second wall positioned between the first and third walls, the second wall configured to block the cross flow from the first aperture so that cooling air passing through the first aperture impinges upon the duct wall in a region that is free of the cross flow, the first wall configured to direct the cross flow away from the first aperture within the cooling flow path and the third wall configured to direct the cross flow away from the first aperture within the cooling flow path; and at least two second flow diverters arranged next to each other, each comprising a wall section, with the wall sections of the second flow diverters oriented relative to each other with an angle in the range of 10° to 160° such that a flow area between the-second flow diverters increases in a downstream direction of the cross flow.

13. The impingement cooling arrangement according to claim 12, wherein during operation the first flow diverter causes a dead water in a downstream direction of the cross flow and in that at least one aperture is arranged in the impingement sleeve such that cooling air impinges on the wall in the dead water.

14. The impingement cooling arrangement according to claim 12, wherein the duct is delimiting a combustion chamber.

15. The impingement cooling arrangement according to claim 12, wherein the first flow diverter is arranged downstream of the first aperture of the plurality of apertures, the first wall, the second wall, and the third wall of the flow divider at least partially defining a U-shape of the first flow divider or a Y-shape of the first flow divider.

16. The impingement cooling arrangement according to claim 12, wherein the first flow diverter is extending from the duct wall to the impingement sleeve.

17. A method for impingement cooling a duct wall of a duct guiding hot gases in a hot gas flow path having an upstream end and a downstream end, wherein an impingement sleeve having a plurality of first apertures is surrounding the duct wall, and spaced at a distance therefrom to form a cooling flow path between the duct wall and the impingement sleeve, the method comprising:

injecting cooling air through the first apertures so that the cooling air flows as cross flow towards an exit at one end of the hot gas flow path after the cooling air impinges on the duct wall, diverting the cross flow away from at least a second aperture of the impingement sleeve by a first flow diverter, which is arranged upstream of the first apertures in the cooling flow path, the first flow diverter comprising:
  a plurality of walls comprising a first wall, a second wall, and a third wall, the second wall positioned between the first wall and the third wall, the second wall configured to block the cross flow from the second aperture so that cooling air passing through the second aperture impinges upon the duct wall in a region that is free of the cross flow, the first wall configured to direct the cross flow away from the second aperture within the cooling flow path and the third wall configured to direct the cross flow away from the second aperture within the cooling flow path; and
  increasing a flow area between at least two second flow diverters arranged next to each other, each of the second flow diverters comprising a wall section, with the wall sections of the second flow diverters oriented relative to each other with an angle in the range of 10° to 160° such that the flow area between the-second flow diverters increases in a downstream direction of the cross flow.

18. The method for impingement cooling duct wall according to claim 17, wherein impingement cooling air is injected through the first apertures downstream of the first flow diverter such that an axial component of flow velocity of cooling air in the cooling flow path is substantially homogeneous at a distance of three times a height of the cooling flow path from the first flow diverter.

19. The method of claim 17, wherein the first, second, and third walls of the first flow diverter at least partially define a Y-shape of the first flow diverter.

20. The method of claim 17, wherein the first, second, and third walls of the first flow diverter at least partially define a U-shape of the first flow diverter.

* * * * *